(12) United States Patent
Scheinkman

(10) Patent No.: US 7,434,227 B2
(45) Date of Patent: Oct. 7, 2008

(54) PORTABLE BUSINESS INFORMATION CONTENT AND MANAGEMENT SYSTEM

(75) Inventor: Luiz Scheinkman, Sunnyvale, CA (US)

(73) Assignee: SAP AG, Walldorf (DE)

( * ) Notice: Subject to any disclaimer, the term of this patent is extended or adjusted under 35 U.S.C. 154(b) by 653 days.

(21) Appl. No.: 10/260,092

(22) Filed: Sep. 27, 2002

(65) Prior Publication Data

US 2003/0065533 A1 Apr. 3, 2003

Related U.S. Application Data

(60) Provisional application No. 60/326,155, filed on Sep. 28, 2001.

(51) Int. Cl.
*G06F 9/44* (2006.01)
(52) U.S. Cl. .................... 719/316; 719/328
(58) Field of Classification Search ............ 705/1, 705/7, 10; 719/310, 328, 331, 332, 315, 719/316, 330; 707/1–10, 100–104.1, 200–206; 706/21
See application file for complete search history.

(56) References Cited

U.S. PATENT DOCUMENTS

| | | | | |
|---|---|---|---|---|
| 5,734,837 | A * | 3/1998 | Flores et al. .................... 705/7 |
| 5,761,656 | A * | 6/1998 | Ben-Shachar .................. 707/4 |
| 5,815,703 | A * | 9/1998 | Copeland et al. ............. 707/102 |
| 5,872,973 | A * | 2/1999 | Mitchell et al. ............. 719/332 |
| 6,330,554 | B1 * | 12/2001 | Altschuler et al. ............ 706/21 |
| 6,560,608 | B1 * | 5/2003 | Tomm et al. ................. 707/102 |
| 6,732,095 | B1 * | 5/2004 | Warshavsky et al. ........... 707/5 |
| 6,732,109 | B2 * | 5/2004 | Lindberg et al. ............. 707/101 |
| 6,826,568 | B2 * | 11/2004 | Bernstein et al. ............... 707/6 |
| 6,901,594 | B1 * | 5/2005 | Cain et al. ................... 719/310 |
| 6,957,438 | B1 * | 10/2005 | Travostino et al. .......... 719/328 |
| 2002/0040314 | A1 * | 4/2002 | Tolson ......................... 705/10 |
| 2002/0046301 | A1 * | 4/2002 | Shannon et al. ............. 709/328 |
| 2003/0055668 | A1 * | 3/2003 | Saran et al. .................... 705/1 |
| 2003/0084120 | A1 * | 5/2003 | Egli ........................... 709/218 |
| 2004/0210445 | A1 * | 10/2004 | Veronese et al. ............... 705/1 |

OTHER PUBLICATIONS

Kolsch "Object-Oriented Re-Engineering of Information Systems in a Heterogeneous Distributed Environment" 1998 IEEE, pp. 104-114.*

Kondo et al "Business Process Management in Customer Contact Service" 1998 IEEE, pp. 493-502.*

(Continued)

*Primary Examiner*—Van H Nguyen
(74) *Attorney, Agent, or Firm*—Fountainhead Law Group P.C.

(57) ABSTRACT

A system and method for generating business content portable across multiple software applications is described. In one embodiment, a universal object model (UOM) is employed to art as an abstraction layer between business content and the application used to create the business content. The UOM generates portable business content from objects and operations uncovered by a descriptive language such as extendable mark-up language (XML). The UOM objects and/or properties are mapped to an application object model (AOM) which is capable of extending the properties and/or operations of the original business application. The portable business content is mapped from the AOM to another application in accordance to the applications application programming interface (API). The business content created by the UOM may be configured for other applications without rewriting the business content by modifying the AOM.

23 Claims, 8 Drawing Sheets

OTHER PUBLICATIONS

Gaedke et al. "Object Oriented Web Engineering for Large-Scale Web Service Management" 1999 IEEE, pp. 1-9.*

Mc.Lellan et al. "Building More Usable APIs" 1998 IEEE, pp. 78-86.*

Stets et al. "Component-Based APIs for Versioning and Distributed Applications" 1999 IEEE, pp. 54-61.*

Kim "APIs for Real-Time Distributed Object Programming" 2000 IEEE, pp. 72-80.*

* cited by examiner

```xml
<?xml version="1.0" ?> <xsd:schema version="1.0"
targetNamespace="http://schemas.toptier.com/tbl/SalesOrder"
xmlns="http://schemas.toptier.com/tbl/SalesOrder"
xmlns:xsd="http://www.w3.org/2000/10/XMLSchema">
<xsd:annotation>
<xsd:documentation>Schema name: SalesOrder</xsd:documentation>
<xsd:appinfo></xsd:appinfo>
</xsd:annotation>
<xsd:element name="SalesOrder">
<xsd:complexType>
<xsd:choice minOccurs="0" maxOccurs="unbounded">
<xsd:element ref="SalesOrderNumber" />
<xsd:element ref="Date" />
<xsd:element ref="CustomerNumber" />
<xsd:element ref="Type" />
<xsd:element ref="Amount" />
<xsd:element ref="Currency" />
<xsd:element ref="Division" />
<xsd:element ref="DeliveryBlock" />
<xsd:element ref="BillingBlock" />
<xsd:element ref="Status" />
</xsd:choice>
</xsd:complexType>
<xsd:annotation><xsd:appinfo /></xsd:annotation></xsd:element>
<xsd:element name="SalesOrderNumber" type="xsd:string">
<xsd:annotation><xsd:appinfo /></xsd:annotation></xsd:element>
<xsd:element name="Date" type="dateTime">
<xsd:annotation><xsd:appinfo /></xsd:annotation></xsd:element>
<xsd:element name="CustomerNumber" type="xsd:string">
<xsd:annotation><xsd:appinfo /></xsd:annotation></xsd:element>
<xsd:element name="Type" type="xsd:string">
<xsd:annotation><xsd:appinfo /></xsd:annotation></xsd:element>
<xsd:element name="Amount" type="fixed.14.4">
<xsd:annotation><xsd:appinfo /></xsd:annotation></xsd:element>
<xsd:element name="Currency" type="xsd:string">
<xsd:annotation><xsd:appinfo /></xsd:annotation></xsd:element>
<xsd:element name="Division" type="xsd:string">
<xsd:annotation><xsd:appinfo /></xsd:annotation></xsd:element>
<xsd:element name="DeliveryBlock" type="xsd:string">
<xsd:annotation><xsd:appinfo /></xsd:annotation></xsd:element>
<xsd:element name="BillingBlock" type="xsd:string">
<xsd:annotation><xsd:appinfo /></xsd:annotation></xsd:element>
<xsd:element name="Status" type="xsd:string">
<xsd:annotation><xsd:appinfo /></xsd:annotation></xsd:element>
<xsd:simpleType name="fixed.14.4">
<xsd:restriction base="xsd:decimal">
<xsd:scale value="4" />
<xsd:minInclusive value="-922337203685477.5808" />
<xsd:maxInclusive value="922337203685477.5807" />
</xsd:restriction>
</xsd:simpleType>
<xsd:simpleType name="dateTime">
<xsd:restriction base="xsd:timeInstant">
<xsd:pattern value="\d*-\d\d-\d\dT\d\d:\d\d:\d\d(:\d\d(\.\d{0,9})?)?" />
</xsd:restriction>
</xsd:simpleType>
```

FIG. 2

```
<Mapping application="SAP" version="4.6">
  <SalesOrder native="SALESORDER">
    <properties>
      <SalesOrderNumber native="VBELN"/>
      <Date native="AUDAT"/>
      <CustomerNumber native="KUNNR"/>
      <Type native="AUART"/>
      <Amount native="NETWR_AK"/>
      <Currency native="WAERK"/>
      <Division native="LIFSK"/>
      <DeliveryBlock native="KDATE"/>
      <BillingBlock native="FAKSK"/>
      <Status native="STATU"/>
      <SalesOrg native="VKORG"/>
      <DistChannel native="VTWEG"/>
    </properties>
    <methods>
      <method name="Get">
        <params>
          <parameter name="SalesOrderNumber"/>
          <parameter name="Date"/>
          <parameter name="CustomerNumber"/>
          <parameter name="Type"/>
          <parameter name="Amount"/>
          <parameter name="Division"/>
          <parameter name="DeliveryBlock"/>
          <parameter name="BillingBlock"/>
          <parameter name="Status"/>
          <parameter name="SalesOrg" mandatory="true" label="Sales Organization"/>
          <parameter name="DistChannel" mandatory="true" label="Distribution Channel"/>
        </params>
        <body>
          <data>
DATA: BEGIN OF VBAK_VBCOM.
  INCLUDE STRUCTURE VBCOM.
DATA: END OF VBAK_VBCOM.
DATA: VBAK_TIME(16) TYPE P.
DATA: BEGIN OF SALESORDER OCCURS 0.
        INCLUDE STRUCTURE VBMTV.
DATA: END OF SALESORDER.
</data>
          <code>
MOVE-CORRESPONDING SALESORDER TO VBAK_VBCOM.
VBAK_VBCOM-AUART = 'TA'.
VBAK_VBCOM-TRVOG = '0'.
VBAK_VBCOM-ZUART = 'C'.
VBAK_VBCOM-MANDT = SY-MANDT.
VBAK_VBCOM-KOPF_DAZU   = 'X'.
VBAK_VBCOM-STAT_DAZU   = 'X'.

TRANSLATE SALESORDER-STATU TO UPPER CASE.
IF SALESORDER-STATU = 'OPEN'.
       VBAK_VBCOM-VBOFF = 'X'.
ENDIF

IF SALESORDER-STATU = 'CLOSED'.
```

FIG. 3

```
<query name="SalesHotList">
    <select>
        <field name="SalesOrderNumber" table="SalesOrder"/>
        <field name="Date" table="SalesOrder"/>
        <field name="Amount" table="SalesOrder"/>
        <field name="Name" table="Customer"/>
    </select>
    <from>
        <table name="SalesOrder"/>
        <table name="Customer"/>
    </from>
    <where>
        <term>
            <field name="Amount" table="SalesOrder" operator="GT">
                <parameter name="Threshold"/>
            </field>
        </term>
    </where>
</query>
```

FIG. 4

For a given Threshold.

Show me the following information from SalesOrder:

- SalesOrderNumber.
- Date.
- Amount.

And the following information from Customer:

- Name.

When the following conditions apply:

- Amount is greater than given Threshold.

FIG. 5

```
<query name="SalesHotList">
    <select>
        <field name="SalesOrderNumber" table="SalesOrder"/>
        <field name="Date" table="SalesOrder"/>
        <field name="Amount" table="SalesOrder"/>
        <field name="Name" table="Customer"/>
    </select>
<from>
        <table name="SalesOrder"/>
        <table name="Customer"/>
</from>
    <where>
        <term>
            <field name="Amount" table="SalesOrder" operator="GT">
                <parameter name="Threshold"/>
            </field>
            <field operator="EQ" table="SalesOrder" name="SalesOrg">
                <parameter name="SalesOrg" mandatory="true" label="Sales Organization"/>
            </field>
            <field operator="EQ" table="SalesOrder" name="DistChannel">
                <parameter name="DistChannel" mandatory="true" label="Distribution
Channel"/>
            </field>
            <field isRelation="true" table="Customer" name="CustomerNumber" operator="EQ">
                <field table="SalesOrder" name="CustomerNumber"/>
            </field>

</term>
    </where>
</query>
```

*FIG. 6*

```
****************************************
* Copyright(c) SAP Portals
* All rights reserved
*
*
*
*
*
*
*
*
*
****************************************
REPORT Z_TBL_SalesHotList no standard page heading.
DATA: BEGIN OF VBAK_VBCOM.
   INCLUDE STRUCTURE VBCOM.
DATA: END OF VBAK_VBCOM.
DATA: VBAK_TIME(16) TYPE P.
DATA: BEGIN OF SALESORDER OCCURS 0.
       INCLUDE STRUCTURE VBMTV.
DATA: END OF SALESORDER.
DATA: CUSTOMER LIKE KNA1 OCCURS 0 WITH HEADER LINE.
ranges: KNA1_No for CUSTOMER-KUNNR,
     KNA1_Name for CUSTOMER-NAME1,
     KNA1_Country for CUSTOMER-LAND1,
     KNA1_City for CUSTOMER-ORT01,
     KNA1_Street for CUSTOMER-STRAS,
     KNA1_Tele for CUSTOMER-TELF1,
     KNA1_Postcode for CUSTOMER-PSTLZ.
parameters: Gsivhslo like SALESORDER-NETWR_AK,
HzovhLit like SALESORDER-VKORG,
WrhgXszm like SALESORDER-VTWEG.
data : tbl_num_of_lines type i.
data : cdataStart(9) value '<![CDATA['.
data : cdataEnd(3) value ']]'.
concatenate cdataEnd '>' into cdataEnd.
* Add BUSDOC Header
write: '<?xml version="1.0" encoding="iso-8859-1"?>'.
write: '<busdoc><header /><dataset>'.
write: '<constructor language="HyperRelational">'.
write: '<query /><cursor /> '.
write: '<properties><name>QueryResults</name></properties>'.
* Add Fields Header
write: '<return><HRRow position="0" dispRows="5">'.
write: '<HRField>' .
write: '<aliasName>'.
write: 'F1'.
write: '</aliasName>' .
write: '<label>'.
write: 'SalesOrderNumber'.
write: '</label>' .
write: '<type>string</type>' .
write: '</HRField>'.
write: '<HRField>' .
write: '<aliasName>'.
write: 'F2'.
```

*FIG. 7A*

```
CUSTOMER-KUNNR = SALESORDER-KUNNR.
* Initializing all the ranges to be used in Select Statement
REFRESH KNA1_No.
if not ( CUSTOMER-KUNNR is initial ) .
  KNA1_No-sign = 'I'.
  KNA1_No-low = CUSTOMER-KUNNR.
  KNA1_No-option = 'EQ'.
  append KNA1_No.
endif.
REFRESH KNA1_Name.
if not ( CUSTOMER-NAME1 is initial ) .
  KNA1_Name-sign = 'I'.
  KNA1_Name-low = CUSTOMER-NAME1.
  KNA1_Name-option = 'EQ'.
  append KNA1_Name.
endif.
REFRESH KNA1_Country.
if not ( CUSTOMER-LAND1 is initial ) .
  KNA1_Country-sign = 'I'.
  KNA1_Country-low = CUSTOMER-LAND1.
  KNA1_Country-option = 'EQ'.
  append KNA1_Country.
endif.
REFRESH KNA1_City.
if not ( CUSTOMER-ORT01 is initial ) .
  KNA1_City-sign = 'I'.
  KNA1_City-low = CUSTOMER-ORT01.
  KNA1_City-option = 'EQ'.
  append KNA1_City.
endif.
REFRESH KNA1_Postcode.
if not ( CUSTOMER-PSTLZ is initial ) .
  KNA1_Postcode-sign = 'I'.
  KNA1_Postcode-low = CUSTOMER-PSTLZ.
  KNA1_Postcode-option = 'EQ'.
  append KNA1_Postcode.
endif.
REFRESH KNA1_Street.
if not ( CUSTOMER-STRAS is initial ) .
  KNA1_Street-sign = 'I'.
  KNA1_Street-low = CUSTOMER-STRAS.
  KNA1_Street-option = 'EQ'.
  append KNA1_Street.
endif.
REFRESH KNA1_Tele.
if not ( CUSTOMER-TELF1 is initial ) .
  KNA1_Tele-sign = 'I'.
  KNA1_Tele-low = CUSTOMER-TELF1.
  KNA1_Tele-option = 'EQ'.
  append KNA1_Tele.
endif.
* The main SELECT statement
select * from KNA1 into TABLE CUSTOMER
     where KUNNR in KNA1_No AND
         NAME1 in KNA1_Name AND
         LAND1 in KNA1_Country AND
```

FIG. 7B

PORTABLE BUSINESS INFORMATION CONTENT AND MANAGEMENT SYSTEM

COPYRIGHT NOTICE

A portion of the disclosure recited in the specification and the figures contains material which is subject to copyright protection. The copyright owner has no objection to the facsimile reproduction of the specification as filed in the Patent and Trademark Office. Otherwise, all copyright rights are reserved.

BACKGROUND OF THE INVENTION

This invention relates generally to software objects that are portable across multiple applications and application versions.

The creation of business content (e.g., reports, business process, etc.) is usually closely tied to the application specific object model and application programming interface (API), thus making it extremely hard to port business content from one application to another. Usually, the business content must be rewritten for the second application.

Additionally, changes to the application, due to maintenance, customer customizations and/or version upgrades, must be propagated to every single business component affected by the changes. Therefore, the porting of business content from different versions of the same application also often requires a rewrite/update of every single business component.

The process of developing business content for an application usually involves defining the functional requirements of the business content and the implementation of the business content using the application's defined object model and API thus creating a strong dependency between the business content functional definition and its implementation.

BRIEF SUMMARY OF THE INVENTION

Embodiments according to the invention allow the creation of business content that is portable across multiple applications as well as multiple application versions. In some embodiments, business content can be created that, in effect, is self-aware of customer implementations and/or modifications to the core application. Additionally, some embodiments permit isolating the business content from the underlying application's changes, upgrades and/or maintenance.

Embodiments according to the present invention also isolate the business and functional expertise, responsible for defining the functional requirements of the business content, from technical expertise, responsible for implementing the business content for the underlying application. Thus, business content that is independent from the implementation can be created.

In one embodiment, a business content management system is provided. The system comprises an object mapper coupled to receive a first business content, the first business content comprising objects from a universal object model, wherein the object mapper maps the first business content to a second business content according to first mapping rules, the second business content comprising objects from an application object model. The system also comprises an application programming interface mapper coupled to receive the second business content, wherein the application programming interface mapper maps the second business content to a third business content according to second mapping rules, the third business content comprising application specific data.

These and other embodiments of the present invention, as well as its advantages and features are described in more detail in conjunction with the text below and attached Figures.

BRIEF DESCRIPTION OF THE DRAWINGS

FIG. 2 is an example of a definition of a sales order object of a universal object model (UOM) using XML descriptive language;

FIG. 3 is an example of a mapping of a sales order object to an object of an Application Object Model;

FIG. 4 is an example of business content built using XML descriptive language;

FIG. 5 is an example of business content built using natural language;

FIG. 6 is an example of a mapping of business content from a UOM to an Application Object Model;

FIGS. 7A and 7B are an example of business content mapped into application specific code.

DESCRIPTION OF THE SPECIFIC EMBODIMENTS

Figure 1:
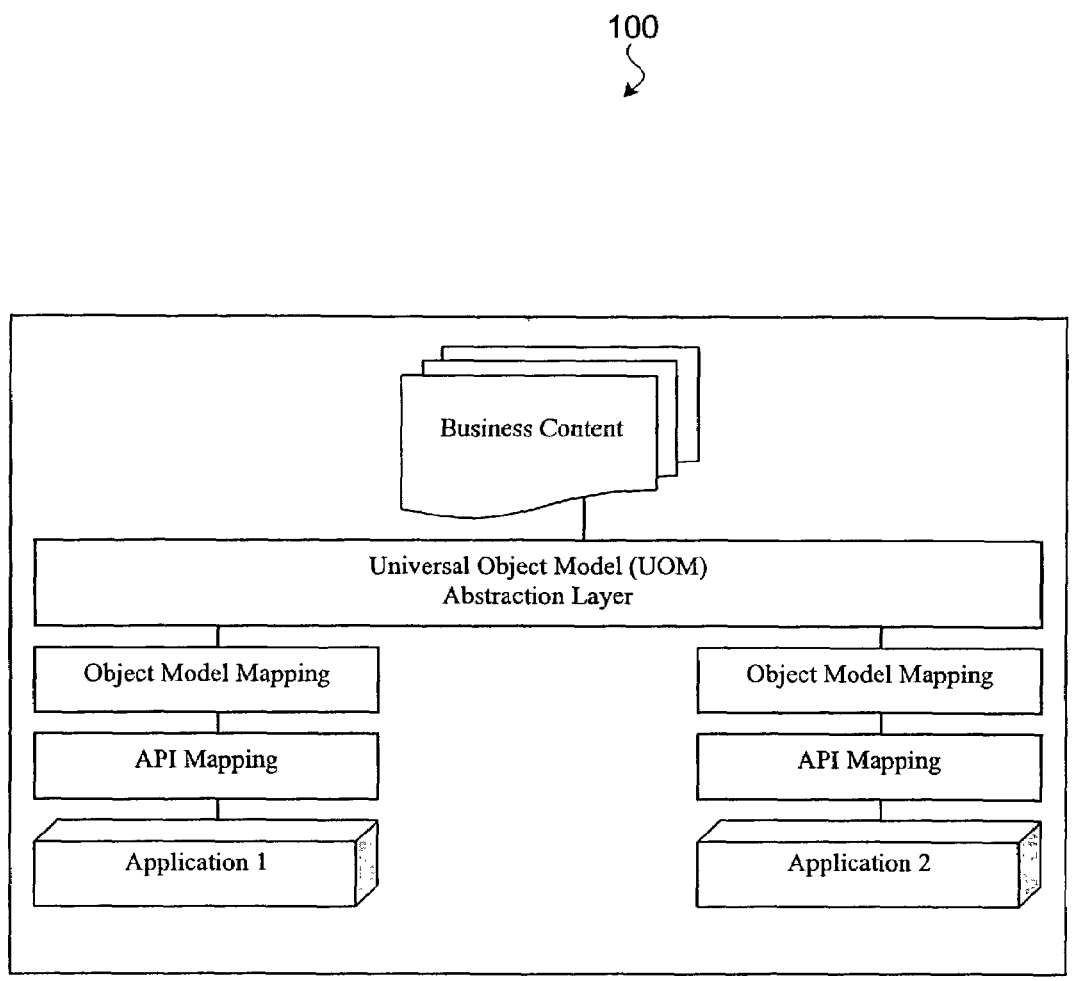
FIG. 1 is a simplified diagram of one embodiment of a system according to the present invention.

Some embodiments according the present invention use a universal object model (UOM) that acts as an abstraction layer between the business content and an application that creates the business content (see FIG. 1).

Each object (see FIG. 2) from the UOM is mapped (see FIG. 3) to an object of an application object model (AOM), which can extend the UOM by exposing application specific properties and/or operations. In a similar way, the UOM can extend the AOM by forcing the mapping of properties and/or operations required by the UOM but that do not exist in the original application.

Business content can be built using objects and operations exposed by the UOM using a descriptive language such as, for example, XML (see FIG. 4), SQL, natural language (see FIG. 5), etc. The natural language commands of FIG. 5 correspond to the XML structures of FIG. 4.

The business content is then mapped from the descriptive language to an AOM exposing the application specific extensions as required/optional properties. FIG. 6 illustrates one example of a mapping of business content from a UOM to a SAP AOM. In this example, a business content is requesting "SalesOrderNumber", "Date" and "Amount" from the "SalesOrder" object. When mapped to the AOM, the "SalesOrder" object exposes two extra properties—"SalesOrg" and "DistChannel"—to its definition marked as mandatory properties. When this business content is mapped to the SAP AOM, it will expose these properties as required parameters even though it wasn't part of the original business content definition.

Then, the AOM is mapped to native business content that is native to the underlying application using the application's proprietary API (see FIG. 7).

In some embodiments, business content is defined by using class definitions, interfaces, etc. When the business content is to be mapped to an underlying application, these class definitions, interfaces, etc., can be extended to accommodate any application requirements. Then, these class definitions, interfaces, etc., are translated into native business content that is native to the underlying application.

Business content comprises one or more business objects from the UOM, its properties and/or operations, combined in a manner that creates content to for a user. FIG. 2 is an example of a definition of a sales order object of a UOM using XML descriptive language. Examples of business content include, but are not limited to, reports and business processes. Examples of business processes include, but are not limited to, a block of sales orders from customers whose balance is above a threshold, and an alert when a customer's balance exceeds a threshold. In some embodiments, the expertise required to create business content is focused on the functional part of the business content, rather than the application-specific programming API.

The UOM can be partitioned into fields of specialization that each comprise objects pertinent to that field. For example, a "sales & distribution object model" would comprise objects pertinent to "sales & distribution". In some embodiments, the different specialized object models would be interlinked, creating a network of specialized object models, thus creating the UOM. The UOM determines the vocabulary that the business content descriptive language will use in order to create business content.

The object model mapping maps between each business object represented by the UOM to its counterpart for the underlying application. FIG. 3 is an example of a mapping of a sales order object to an object of an AOM. As described above, FIG. 6 is an example of a business content mapped to an SAP AOM.

In typical mapping schemes, one data element from a first application is mapped directly to one data element of a second application. For example, an MSOutlook "contact" would be mapped directly to a Palm "contact". In embodiments according to the present invention, however, the UOM acts as a hub to which data elements from different applications are mapped. The mapping from one application is performed without knowledge of other applications. For example, an MSOutlook "contact" would be mapped to a UOM "contact", and a Palm "contact" would be mapped to the UOM "contact" as well.

The application is allowed to extend the business content object model by exposing extra functionality at this layer. By doing so, it may influence the behavior of the business content itself by allowing it to adapt to the underlying application.

An example of such extensions would be an addition of mandatory fields, which are essential to the application, but not part of the UOM. In this case, these properties would be exposed to the business object as required properties when mapped to this specific application, but would not exist when the business object is mapped to a different application that does not require these properties.

The object model mapping is closely tied to the underlying application. Therefore, when changes are made to the underlying application due to maintenance, customer customizations, version upgrades, etc., the object model mapping should be updated as well to reflect the changes. The business content, however, remains independent of the underlying application. Thus, when changes are made to the underlying application, the business content need not be updated.

Porting any business content created using the UOM to another application, can be done by rewriting the AOM mapping and does not require a rewrite of the business content itself. The business content should remain unaware of changes on the AOM.

The business content can then be mapped into native code for the Application using the Application's API. FIGS. 7A and 7B are an example of a business content mapped into SAP native code (ABAP).

Figure 8:
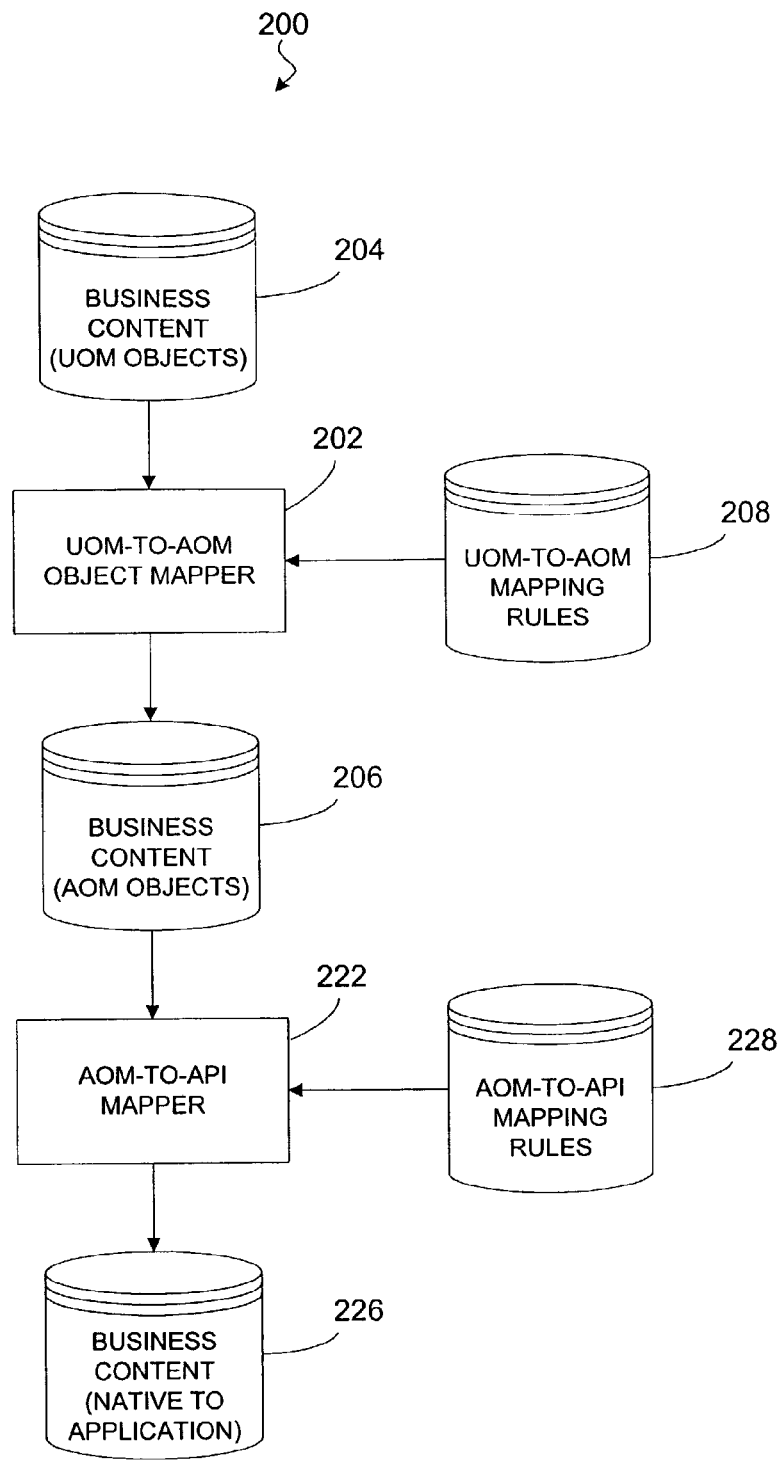
FIG. 8 is a simplified block diagram of one embodiment of a system according to the present invention.

FIG. 8 illustrates one embodiment of a system 200 according to the present invention. In this embodiment, an object mapper 202 maps business content 204, built using objects, operations, etc., exposed by the UOM, to business content 206 comprising objects of an AOM. Object mapper 202 maps according to rules 208 that govern how objects, operations, etc., in the UOM are mapped to objects operations, etc., in the AOM. In some embodiments, the rules 208 can also specify how objects, operations, etc., in the UOM that do not have corresponding objects, operations, etc., in the AOM are to be mapped. Similarly, the rules 208 can also specify objects, operations, etc., not in the UOM but that are required in the AOM.

The system 200 also includes an API mapper 222 maps the AOM business content 206 to business content 226 native to an underlying application. API mapper 222 maps according to rules 228 that govern how objects, operations, etc., in the AOM are mapped to native code.

In some embodiments, object mapper 202 and API mapper 222 can be implemented in one or more application programs running on a single workstation, personal computer, etc., or can be implemented as multiple programs in a distributed computing environment, such as a workstation, personal computer or a remote terminal in a client server relationship. In FIG. 8, business content 204, 206 and 226, and mapping rules 208 and 228 are symbolically depicted as separate databases. It is to be understood, however, that business content 204, 206 and 226, and mapping rules 208 and 228 can be included in a single database, distributed among several databases, etc.

The above description is illustrative and not restrictive. Many variations of the invention will become apparent to those of skill in the art upon review of this disclosure.

What is claimed is:

1. A business content management system, comprising:
a processor;
a memory coupled to the processor, wherein the memory is configured to store code comprising:
an object mapper configured to process a first business content, the first business content comprising objects from a universal object model, wherein the object mapper is configured to map the first business content to a second business content according to first mapping rules, the second business content comprising objects from an application object model, wherein the first mapping rules govern the mapping of objects from the universal object model to the application object model, and wherein the universal object model is configured to extend the application object model using properties associated with the universal object model, and the application object model is configured to extend the universal object model using application specific properties associated with the application object model; and
an application programming interface mapper configured to process the second business content, wherein the application programming interface mapper is configured to map the second business content to a third business content according to second mapping rules, wherein the second mapping rules govern mapping the objects from the application object model to the third business content in a native code format in accordance with an application programming interface associated with a program used to execute the third business content;
wherein the first business content remains independent of changes to the first mapping rules, and
wherein the universal object model is configured as an abstraction layer disposed between the first business content and an application used to generate an initial business content associated with the first business content.

2. The system of claim 1, wherein the object mapper is configured to expose the objects or operations used to generate the first business content.

3. The system of claim 1, wherein the first business content comprises extended mark-up language, or structured query language, or natural language.

4. The system of claim 1, wherein the application object model is employed to expose application specific extensions associated with application properties.

5. The system of claim 1, wherein the application object model provides at least some additional properties to the first business content using application object models.

6. A computer program product stored on a computer-readable storage medium for generating portable business content, the computer program product comprising:
   code to generate, from a first business content, objects of a universal object model; and
   code to map the objects of the universal object model to objects of an application object model using first mapping rules that govern the mapping of objects from the universal object model to the application object model, wherein the universal object model is configured to extend the application object model using properties associated with the universal object model, and wherein the application object model is configured to extend the universal object model using application specific properties associated with the application object model, wherein the application object model is configured to modify properties of the objects of the universal object model to generate a second business content suitable for use with a first application or modify the properties of the objects of the universal object model to generate a third business content suitable for use with a second application, wherein the universal object model is configured as an abstraction layer disposed between the first business content and the first and second applications; and
   code to enable transfer of data between the first application and the second application, wherein the universal object model is configured as a layer of abstraction between the first application and the second application, the code further comprising:
   code to map a fourth business content comprising data from the first application to a fifth business content comprising objects according to the universal object model;
   code to map the fifth business content to sixth business content suitable for use with the second application;
   wherein the second mid fourth business content remains independent of changes made to the first application mad wherein the third and sixth business content remains independent of changes made to the second application.

7. The computer program product of claim 6, wherein the application object model is configured to extend class definitions or interfaces of the first business content to generate the second business content or the third business content.

8. The computer program product of claim 6, wherein the second business content or the third business content is derived from one or more objects of the universal object model.

9. The computer program product of claim 6, wherein the universal object model comprises subsets of objects grouped by two or more class definitions.

10. The computer program product of claim 6, wherein the universal object model is configured as a hub to which data elements from the first application or the second application ate mapped.

11. The computer program product of claim 6, wherein the generation of the second business content or third business content is provided by modifying the application object model.

12. The computer program product of claim 6, wherein the objects of the application object model comprise properties or operations associated with the first application or the second application.

13. The computer program product of claim 6, wherein at least some properties or operations of the second business content or the properties or operations associated with the third business content extend the properties or operations associated with the first business content.

14. A method of generating portable business content, the method comprising:
   mapping a first business content to a second business content according to first mapping rules, wherein the first business content comprises objects from a universal object model and the second business content comprises objects from an application object model, wherein the first mapping rules govern the mapping of objects from the universal object model to the application object model, and wherein the universal object model is configured to extend the application object model using properties associated with the universal object model, and the application object model is configured to extend the universal object model using application specific properties associated with the application object model; and
   mapping the second business content to a third business content according to second mapping rules, wherein the second mapping rules govern mapping the objects from the application object model to the third business content in a native code format in accordance with an application programming interface associated with a program used to execute the third business content;
   wherein the first business content remains independent of changes to the first mapping rules, and
   wherein the universal object model is configured as an abstraction layer disposed between the first business content and an application used to generate an initial business content associated with the first business content.

15. The method of claim 14, wherein the first business content remains independent to the second business content.

16. The method of claim 14, wherein the second business content remains independent to the program.

17. The method of claim 14, further comprising adding parameters of the first business content that are not part of the second business content.

18. The method of claim 14, wherein the second business content comprises one or more class definitions or interfaces that are extendable to accommodate one or more required fields of the program.

19. The method of claim 14, wherein the universal object model is partitioned into a plurality of fields of specialization containing objects pertinent to that field.

20. The method of claim 14, further comprising exposing objects or operations used to generate the first business content.

21. The method of claim 14, wherein the first business content comprises extended mark-up language, or structured query language, or natural language.

22. The method of claim 14, wherein the application object model exposes application specific extensions associated with application properties.

23. The method of claim 14, wherein the application object model provides at least some additional properties to the first business content using application object models.

* * * * *